United States Patent
Bazin et al.

(10) Patent No.: US 11,268,680 B2
(45) Date of Patent: Mar. 8, 2022

(54) CONNECTED LAMP AND LAMP CONTROL METHOD

(71) Applicant: The Swatch Group Research and Development Ltd, Marin (CH)

(72) Inventors: Jean-Luc Bazin, Tuscherz-Alfermee (CH); Jean-Claude Gracia, Morigen (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/802,762

(22) Filed: Nov. 3, 2017

(65) Prior Publication Data

US 2018/0160085 A1    Jun. 7, 2018

(30) Foreign Application Priority Data

Dec. 5, 2016  (EP) .................................... 16202234

(51) Int. Cl.
*F21V 21/08* (2006.01)
*F21V 23/04* (2006.01)
(Continued)

(52) U.S. Cl.
CPC .......... *F21V 21/084* (2013.01); *F21V 23/045* (2013.01); *F21V 23/0435* (2013.01);
(Continued)

(58) Field of Classification Search
CPC .. H04N 9/3173; H04N 9/3179; H04N 9/3129; G04G 21/04; H05B 37/0272;
(Continued)

(56) References Cited

U.S. PATENT DOCUMENTS 9,477,888 B1 * 10/2016 Lewis ..................... G06F 1/163
2009/0091710 A1 * 4/2009 Huebner ................ G03B 21/14
353/28

(Continued)

FOREIGN PATENT DOCUMENTS

CN        105065962 A     11/2015
DE    20 2005 015 809 U1    2/2007

(Continued)

OTHER PUBLICATIONS

European Search Report dated May 12, 2017 in European Application 16202234.7, filed on Dec. 5, 2016 (with English Translation of Categories of cited documents).

(Continued)

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

A portable connected lamp makes it possible to project a pattern. The lamp includes lighting to transmit a light. The lighting includes a transmitter to transmit at least one light beam and a projector arranged to project at least one light pattern. The lamp also includes a receiver to receive control instructions via a wireless connection, the control instructions including data to be projected, and a controller to control the projector so that they project the data received by the receiver.

13 Claims, 2 Drawing Sheets

(51) Int. Cl.
*F21V 33/00* (2006.01)
*H05B 47/19* (2020.01)
*G04G 21/04* (2013.01)
*G09G 3/00* (2006.01)
*G09G 5/12* (2006.01)
*H04N 9/31* (2006.01)
*B62J 6/00* (2020.01)
*F21V 21/084* (2006.01)
*H05B 47/165* (2020.01)

(52) U.S. Cl.
CPC ......... *F21V 33/0052* (2013.01); *G04G 21/04* (2013.01); *G09G 3/002* (2013.01); *G09G 5/12* (2013.01); *H04N 9/3129* (2013.01); *H04N 9/3173* (2013.01); *H04N 9/3179* (2013.01); *H05B 47/165* (2020.01); *H05B 47/19* (2020.01); *B62J 6/00* (2013.01)

(58) Field of Classification Search
CPC ........ G09G 5/12; G09G 3/002; F21V 23/045; F21V 23/0435; F21V 21/084; F21V 33/0052; B62J 6/00
See application file for complete search history.

(56) References Cited

U.S. PATENT DOCUMENTS

| | | | |
|---|---|---|---|
| 2009/0244490 A1* | 10/2009 | Nakamura | G03B 21/2053 353/43 |
| 2009/0284622 A1* | 11/2009 | Wills | H04N 5/2251 348/231.99 |
| 2010/0213849 A1 | 8/2010 | Chien | |
| 2010/0277952 A1 | 11/2010 | Chien | |
| 2011/0013398 A1 | 1/2011 | Chien | |
| 2011/0051405 A1 | 3/2011 | Chien | |
| 2011/0085323 A1 | 4/2011 | Chien | |
| 2011/0164415 A1 | 7/2011 | Chien | |
| 2012/0057370 A1 | 3/2012 | Chien | |
| 2014/0118704 A1* | 5/2014 | Duelli | H04N 9/3194 353/70 |
| 2014/0293245 A1* | 10/2014 | Tani | G03B 21/2053 353/85 |
| 2015/0070595 A1 | 3/2015 | Chien | |
| 2015/0070938 A1 | 3/2015 | Chien | |
| 2015/0159843 A1 | 6/2015 | Chien | |
| 2015/0305087 A1* | 10/2015 | Leigh Blakeney | G03B 21/145 348/744 |
| 2015/0312704 A1* | 10/2015 | Tarnhed | H04W 4/80 455/41.1 |
| 2016/0097499 A1 | 4/2016 | Chien | |
| 2016/0097500 A1 | 4/2016 | Chien | |
| 2016/0258599 A1 | 9/2016 | Genthon | |
| 2016/0330417 A1* | 11/2016 | Lin | B62J 6/00 |
| 2016/0353560 A1* | 12/2016 | Bortolotti | H04W 4/70 |
| 2017/0123214 A1* | 5/2017 | Ikegami | G02B 27/0172 |
| 2017/0193303 A1* | 7/2017 | Wexler | G06F 17/30312 |

FOREIGN PATENT DOCUMENTS

| | | |
|---|---|---|
| EP | 1 811 226 A1 | 7/2007 |
| EP | 2 378 186 A2 | 10/2011 |
| JP | 2012-216135 A | 11/2012 |
| WO | WO 2015/121429 A1 | 8/2015 |
| WO | WO 2015/121433 A1 | 8/2015 |

OTHER PUBLICATIONS

Japanese Office Action dated Oct. 27, 2020 in Japanese Patent Application No. 2017-221609 (with English translation), 4 pages.
Chinese Office Action dated Oct. 27, 2020 in Chinese Patent Application No. 201711249655.2 (with English translation), 9 pages.

* cited by examiner

CONNECTED LAMP AND LAMP CONTROL METHOD

This application claims priority from European Patent Application No. 16202234.7 filed on Dec. 5, 2016, the entire disclosure of which is hereby incorporated herein by reference.

FIELD OF THE INVENTION

The invention relates to a connected or smart lamp and to a method for controlling a connected lamp. The invention also relates to a watch that can control such a connected lamp.

BACKGROUND OF THE INVENTION

When runners or cyclists move at night, they use a lamp to find their way. Nonetheless, all their attention must be on the path they are taking, so that they must stop to consult a watch or GPS, which is restrictive, particularly on trails or races.

Further, the lamp is often placed on the athlete's head or bike, making it is difficult to access when the athlete is moving, particularly at high speed or over uneven ground.

SUMMARY OF THE INVENTION

It is an object of the invention to overcome the drawbacks of the state of the art by proposing a portable connected or smart lamp for athletes in which the transmitted light is controlled by a third-party accessory, and in particular by a watch.

It is another object of the invention to propose a portable athlete's lamp able to project data sent by an external object connected to the lamp by a wireless connection.

More specifically, a first aspect of the invention concerns a portable connected lamp comprising:
  Lighting means configured to transmit a light, the lighting means including:
    means for transmitting at least one light beam;
    projection means arranged to project at least one light pattern;
  Reception means configured to receive control instructions via a wireless connection, the control instructions including data to be projected;
  Control means configured to control the projection means so that they project the data received by the reception means.

The lamp can thus receive data to be projected from a connected object.

This connected object is preferably a watch which can send the lamp data relating to the time, to the date, to the athlete's speed, to his or her acceleration, or timing data.

The connected object may also be connected to a mobile telephone which makes it possible to send data relating to the athlete's position, for example in the form of GPS data, or data relating to an incoming or outgoing call.

The connected object may also be an archway under which the athlete passes during a race, the received data in this case may relate to the athlete's position in the race, or to his speed, or to his distance from the finish line.

The lamp according to the first aspect of the invention may also exhibit one or more of the following features, taken individually or in all technically possible combinations:
  the lamp is preferably a head lamp;
  the lamp may be a bicycle lamp;
  the lamp has external dimensions of less than 6 cm;
  the lamp has a weight of less than 200 g, and preferably less than 100 g,
  the lamp preferably includes means of attachment: these attachment means may be a headband arranged to fix the lamp to the sportsman's head or a fastener configured to fix the lamp to a bicycle;
  the projection means preferably include a laser scanning projector;
  the laser scanning projector preferably includes:
    a photonic module including three primary lasers respectively transmitting green, red and blue laser beams;
    at least one scanning mirror;
    an electronic module configured to control the lasers and the mirror.
  the lamp may include transmission means arranged to send to a connected object, via a wireless connection, parameters relating to the state of the lamp;
  the lamp may include sensors measuring parameters relating to the state of the lamp;
  the control means may be able to control the features of the light transmitted by the lighting means according to the control instructions received;
  the lamp may also include a processor configured to generate data to be projected;
  the lamp may also comprise a memory configured to store data to be projected.

A second aspect of the invention concerns a connected watch configured to control a lamp, the watch including:
  a processor configured to generate control instructions to be sent to the lamp;
  a user interface configured to allow a user to control the control instructions generated by the processor by inputting an actuation sequence in the user interface;
  transmission means configured to send the control instructions to the lamp via a wireless connection.

The watch thus allows the lamp's functions to be remotely controlled, so that the user only needs to have access to his watch to control his lamp.

The watch according to the second aspect of the invention may also exhibit one or more of the following features, taken individually or in all technically possible combinations:
  the processor may be configured to generate the control instructions to be sent to the lamp according to the parameters generated by the watch;
  the watch may include wireless reception means configured to receive, via a wireless connection, parameters sent by a lamp, the processor further being configured to generate the control instructions to be sent to the lamp according to the parameters received by the wireless reception means of the watch;
  the user interface preferably includes at least one push button; the processor being configured to generate control instructions in response to actuation of the push button in a predetermined actuation sequence;
  the watch includes a memory in which are stored the control instructions associated with each actuation sequence.

A third aspect of the invention concerns an assembly comprising a lamp according to the first aspect of the invention and a watch according to the second aspect of the invention.

A fourth aspect of the invention concerns a method for control of a connected lamp, the lamp including lighting means configured to transmit a light, the lighting means including:

means for transmitting at least one light beam;
projection means arranged to project at least one light pattern;
the method including the following steps:
Establishing a wireless connection between the lamp and the connected object;
Reception by the lamp of control instructions sent by the connected object via the wireless connection, the control instructions including data to be projected;
Controlling the projection means so that they project the data to be projected.

The method according to the fourth aspect of the invention may also exhibit one or more of the following features, taken individually or in all technically possible combinations:
- The control instructions may include instructions relating to the features of the projected pattern, the method including a step of controlling the projection means so that the projected pattern exhibits features conforming to the control instructions;
- The features of the projected pattern may be its intensity, its colour(s), its dimensions;
- The control instructions may include instructions relating to the features of the light beam, the method including a step of controlling the transmission means of the at least one light beam so that the at least one light beam exhibits features conforming to the control instructions;
- The features of the light beam(s) may be the intensity, the colour(s), or the dimensions thereof.

BRIEF DESCRIPTION OF THE DRAWINGS

Other features and advantages will appear clearly from the following description, given by way of non-limiting illustration, with reference to the annexed drawings, in which.

DETAILED DESCRIPTION OF ONE EMBODIMENT

Figure 1:
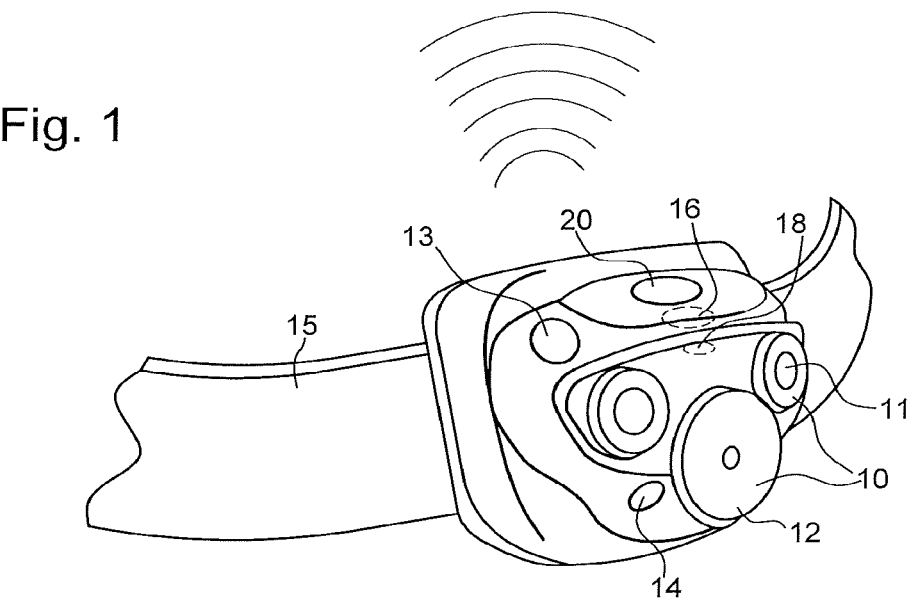
FIG. 1 schematically represents a connected lamp according to one embodiment of the invention.

FIG. 1 schematically represents a portable lamp 3 according to one embodiment of the invention. This portable lamp 3 is a lamp for athletes, and preferably a head lamp or a lamp intended to be fixed to a bicycle.

Portable lamp 3 includes lighting means 10 configured to transmit a light. These lighting means 10 include means 11 for transmitting at least one light beam. These light beam transmission means may, for example, include one or more light emitting diodes.

Lighting means 10 also include projection means 12 arranged to project at least one light pattern. The projection means are arranged to project a pattern of the head-up display type. These projection means 12 preferably include a laser scanning projector. Such a projector is advantageous since it provides good focus regardless of the distance of projection. This laser scanning projector preferably includes:

A photonic module including three primary lasers respectively transmitting green, red and blue laser beams;
At least one scanning mirror;
An electronic module configured to control the lasers and the mirror.

Portable lamp 3 also includes communication means configured to communicate via a wireless connection with the communication means of a watch.

The communication means of the lamp include reception means 13 arranged to receive, via a wireless connection, control instructions sent by the watch. These reception means may be a Bluetooth or Bluetooth Low Energy receiver, or an optical receiver, depending on the wireless connection used.

The communication means of the lamp may also include transmission means 14 configured to transmit to the watch, via a wireless connection, parameters, and particularly parameters regarding the state of the lamp. These transmission means 14 may be a Bluetooth or Bluetooth Low Energy transmitter, or an optical transmitter, depending on the wireless connection used.

The lamp also includes a cell or battery arranged to power the lighting means and the communication means of the watch.

The lamp may also include at least one sensor configured to measure:
parameters relating to the lamp, such as, for example, state of charge of the battery or cell, the light intensity transmitted, etc. and/or
parameters relating to the external environment, such as, for example, the altitude, temperature, speed, GPS coordinates, etc.

The lamp also includes control means 18 arranged to control the light transmitted by the lighting means according to the control instructions received.

More specifically, control means 18 are configured to control the projection means so that they project the data received by reception means 13.

Control means 18 may also be configured so that they control, in accordance with the instructions received by the reception means:
the features of the light transmitted by light beam transmission means 11, especially the intensity, colour, direction, and dimensions of the light beam(s);
the features of the pattern projected by the projection means (12) and in particular its intensity, colour(s), direction, and dimensions;

The lamp may also be a user interface 20 which allows the user to light the lamp and/or to authorise connections between the lamp and a connected object external to the lamp. This user interface 20 preferably includes a button.

Portable lamp 3 also includes means of attachment. In this embodiment, the attachment means include a headband 15 allowing the head lamp to be attached to the user's forehead.

Lamp 3 makes it possible to project data received by means of a wireless connection and sent by an object connected to the lamp.

This connected object may be, for example, a mobile telephone which makes it possible to send data relating to the athlete's position, for example in the form of GPS data, or data relating to an incoming or outgoing call.

The connected object may also be an archway under which the athlete passes during a race, the received data in this case may relate to the athlete's position in the race, or to his speed, or to his distance from the finish line.

According to a preferred embodiment, this connected object may be a watch which can send the lamp data relating to the time, to the date, to the athlete's speed, to his or her acceleration, or even timing data.

Figure 2:
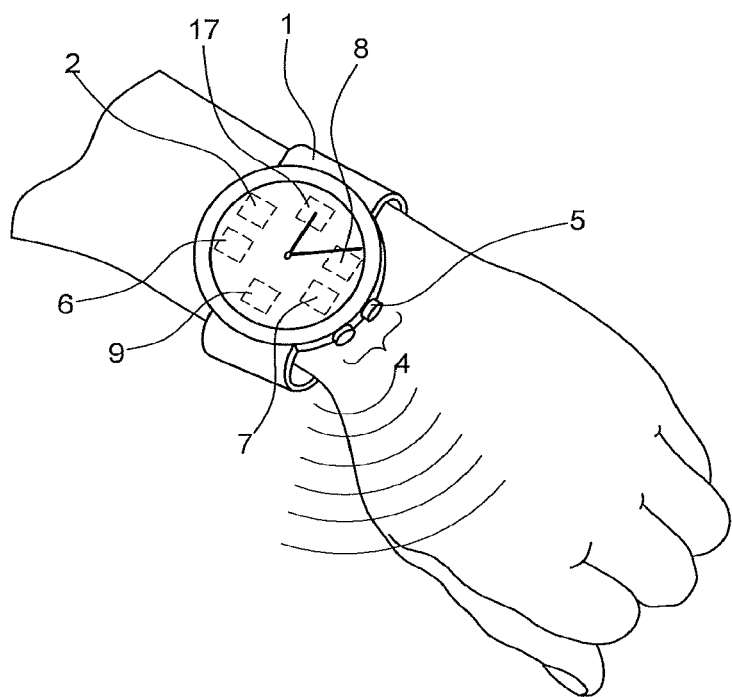
FIG. 2 schematically represents a connected watch according to one embodiment of the invention.

Thus, FIG. 2 represents a connected watch 1 according to one embodiment of the invention. The connected watch includes a processor 2 configured to generate control instructions to be sent to a portable lamp 3.

Watch 1 also includes a user interface 4 configured to enable a user to control the instructions generated by processor 2. User interface 4 may, for example, include one or more of the following elements:
- a push button,
- a crown.

In this example, the user interface includes two push buttons 5.

The watch also includes a memory 6 in which are stored actuation sequences for the user interface associated with control instructions from processor 2.

Processor 2 is configured to generate control instructions in accordance with actuation sequences inputted into user interface 4 by the user, and also in accordance with data generated by the watch, such as the time, the date, the athlete's speed, his or her acceleration, calories burned . . . .

The watch also includes wireless communication means configured to communicate, via a wireless connection, with a portable lamp 3. This wireless connection may, for example, be a Bluetooth connection, a Bluetooth Low Energy connection (BLE), an optical connection.

The communication means of the watch include transmission means 7 configured to transmit data to portable lamp 3, via a wireless connection, and in particular the control instructions generated by the processor. These transmission means 7 may be a Bluetooth or Bluetooth Low Energy transmitter, or an optical transmitter, depending on the wireless connection used.

The communication means of the watch may also include reception means 8 arranged to receive, via a wireless connection, the parameters sent by the lamp. These reception means may be a Bluetooth or Bluetooth Low Energy receiver, or an optical receiver, depending on the wireless connection used.

The watch also includes a cell or a battery 17 arranged to power processor 2 and the communication means of the watch.

The watch is able to generate data, such as for example the time or date. It may also include sensors 9 for measuring additional data, such as, for example, the speed of motion of the wearer of the watch, his or her acceleration, altitude, the external temperature, his or her GPS position.

Figure 3:
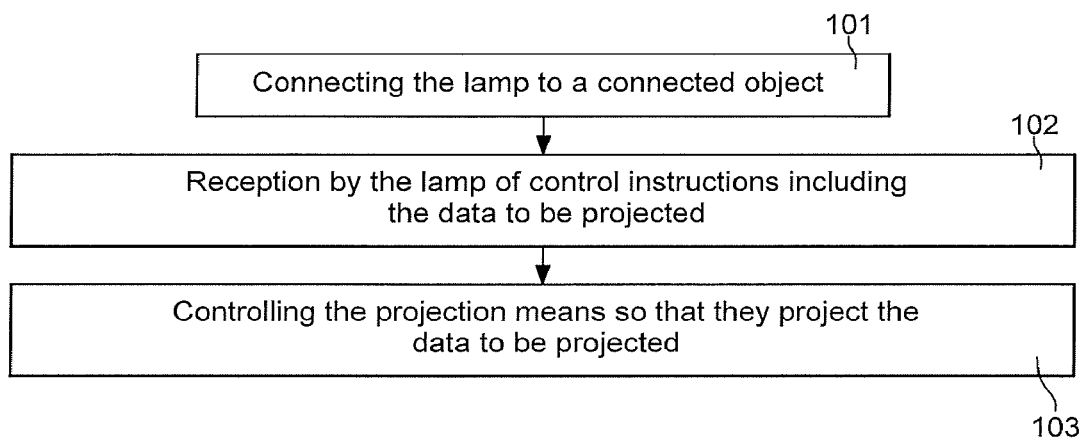
FIG. 3 schematically represents the steps of a control method according to one embodiment of the invention.

A method for controlling the lamp of FIG. 1 by the watch of FIG. 2 will now be described with reference to FIGS. 3 and 4.

The method preferably includes a first step 101 of connecting lamp 3 to watch 1. The object of this first step is to allow/not allow the watch to take control of the lamp and communications between the watch and the lamp. More specifically, the watch can send a connection request to the lamp via the wireless connection. The user can then act on lamp user interface 20 to indicate whether he accepts or declines the connection. When the user actuates the user interface to accept the connection between lamp 3 and watch 1, a wireless connection is established between the lamp and the watch.

The method may then include a step of receiving, via user interface 4 of watch 1, an actuation sequence. Each actuation sequence corresponds to a lamp command.

Thus, it is possible, for example, to store in the watch memory actuation sequences for performing one or more of the following actions on the lamp:
- switching the lamp on or off;
- controlling the intensity, the colour or the direction of the transmitted light beam or beams;
- controlling a pattern that will be projected by the projection means of the lamp.

It is possible, for example, to choose to project:
- data generated by the watch and/or by the lamp,
- data measured by a sensor of the watch or of the lamp,
- data calculated by the watch processor from parameters originating from the watch, and/or from the lamp, and/or from one or more of their sensors;
- data calculated by the lamp processor from parameters originating from the watch, and/or from the lamp, and/or from one or more of their sensors.

After the watch user has inputted an actuation sequence into the watch user interface, the method includes a step of watch processor 2 generating the corresponding control instructions. The control instructions include data to be projected.

The method then includes a step of sending control instructions via the watch transmission means.

The method then includes a step 102 of receiving control instructions via the lamp reception means 13.

The method includes a step 103 of controlling lamp lighting means 10, via lamp control means 18, in accordance with the received control instructions.

More specifically, in this step, control means 18 control projection means 12 so that they project the data received by the lamp reception means.

The control means may also control the features of the projected pattern and/or those of the transmitted light beam or beams.

The method can also include a step of monitoring the state of charge of the battery or cell of lamp 3.

When the charge of the battery or cell of lamp 3 is less than a threshold charge, for example when it is equal to 10% of the total charge capacity of the battery or cell of lamp 3, the method may include a step of requesting charge-saving instructions from the user. This request for instructions may be direct, i.e. it is made directly by the lamp, which may for example transmit a flashing light to tell the user that he needs to act, or it may be indirect, i.e. it may be made via the connected object, to which the lamp wirelessly sends a request for instructions which will then be transmitted to the user via the connected object.

The user may then choose either to disable the projection means to retain only the light beam transmission means or conversely to disable the light beam transmission means to retain only the projection means. Alternatively, the user may also choose to keep both the light beam transmission means and the projection means enabled.

The charge-saving instructions are then transmitted to lamp control means 18 which act accordingly on the light beam transmission means and/or on the projection means.

Figure 4:
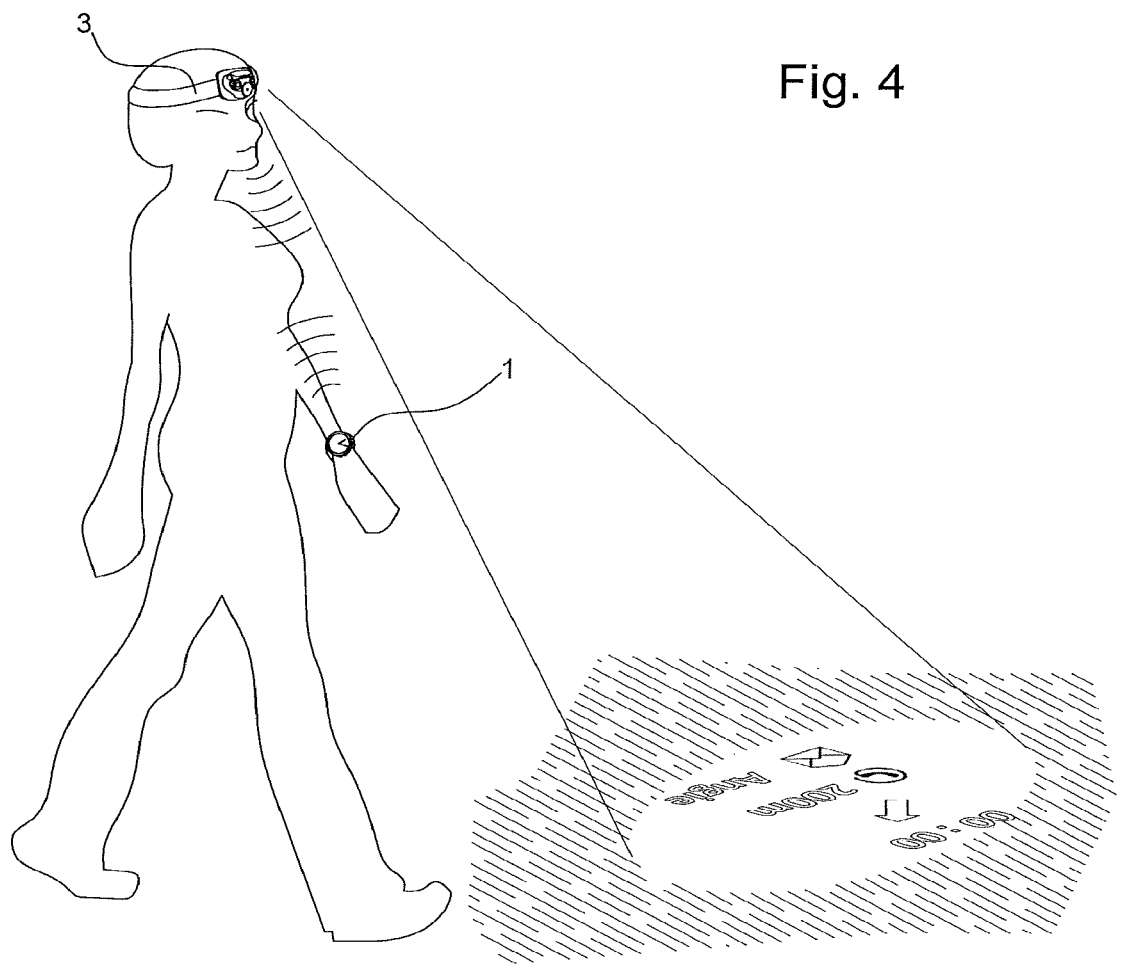
FIG. 4 schematically represents a light transmitted by a lamp in response to a method according to one embodiment of the invention.

With reference to FIG. 4, the method therefore makes it possible to transmit at least one light beam 21 whose features can be controlled by means of a connected object. Further, by means of projected pattern 22, the method allows light information to be displayed.

The method thus allows the functions of a lamp to be remotely controlled by means of a connected watch. The method makes it possible to choose, by means of a watch, which information to project with the lamp. The method thus allows the wearer to access a head-up display.

Naturally, the invention is not limited to the examples described with reference to the Figures and variants could be envisaged without departing from the scope of the invention. In particular, an object other than a watch could be used to send the information to be projected. It is also possible to envisage displaying different parameters from than those mentioned, such as, for example, the calories burned by an athlete, his distance from the finish line, his GPS coordinates, encouragements from family and friends received by text message.

What is claimed is:

1. A portable lamp wirelessly connected to a connected object, said portable lamp comprising:
   lighting circuitry configured to transmit a light, the lighting circuitry including:
   (i) light beam transmission circuitry configured to transmit at least one light beam corresponding to the transmitted light, and
   (ii) a laser scanning projector configured to project received data and including a focusing element, the received data including semantic information to be displayed as a light pattern containing alphanumeric characters;
   communication circuitry configured to communicate with the connected object via one of a Bluetooth wireless connection and an optical wireless connection, the communication circuitry including:
   (i) a receiver configured to receive control instructions from the connected object, the control instructions including the received data that includes the semantic information to be displayed as the light pattern containing the alphanumeric characters, and
   (ii) a transmitter configured to transmit parameters to the connected object;
   a battery configured to power the lighting circuitry and the communication circuitry; and
   control circuitry configured to:
   (i) control the light transmitted by the lighting circuitry based on the received control instructions, and
   (ii) control the laser scanning projector according to the received control instructions so that said laser scanning projector projects the received data as the light pattern containing the alphanumeric characters,
   wherein said portable lamp is a head lamp and each of the lighting circuitry, the communication circuitry, the battery, and the control circuitry are disposed therein,
   wherein in a state in which both the light beam transmission circuitry and the laser scanning projector are turned on, the control circuitry is configured to turn off one of the light beam transmission circuitry and the laser scanning projector while keeping the other of the light beam transmission circuitry and the laser scanning projector turned on.

2. The portable lamp according to claim 1, wherein the laser scanning projector further includes:
   a photonic module including three primary lasers respectively configured to transmit green, red, and blue laser beams,
   at least one scanning mirror, and
   an electronic module configured to control the three primary lasers and the at least one scanning mirror.

3. The portable lamp according to claim 1, wherein the control circuitry is further configured to control features of the light transmitted by the lighting circuitry according to the control instructions received.

4. The portable lamp according to claim 1, wherein the parameters include a state of the portable lamp.

5. The portable lamp according to claim 1, further comprising sensors configured to measure the parameters including a state of the portable lamp.

6. The portable lamp according to claim 1, further comprising a processor configured to generate data corresponding to the light pattern to be projected.

7. The portable lamp according to claim 6, further comprising a memory configured to store the generated data corresponding to the light pattern to be projected.

8. An assembly, comprising:
   the portable lamp according to claim 1; and
   a connected object configured to control the portable lamp, the connected object including:
   (i) a processor configured to generate the control instructions,
   (ii) a user interface configured to allow a user to control the control instructions generated by the processor by inputting an actuation sequence in the user interface, and
   (iii) a transmitter configured to transmit the control instructions to the portable lamp.

9. The portable lamp according to claim 1, wherein the connected object is a watch that communicates with the portable lamp via one of the Bluetooth wireless connection and the optical wireless connection.

10. A method for controlling a portable lamp, the portable lamp including lighting circuitry configured to transmit a light, the lighting circuitry including (i) light beam transmission circuitry configured to transmit at least one light beam corresponding to the transmitted light and (ii) a laser scanning projector configured to project received data and including a focusing element, the received data being semantic information to be displayed as a light pattern containing alphanumeric characters, the portable lamp being a head lamp having the (a) lighting circuitry, (b) communication circuitry, (c) a battery, and (d) control circuitry disposed therein, the method comprising:
   establishing, between the portable lamp and a connected object, one of a Bluetooth wireless connection and an optical wireless connection;
   receiving, by a receiver of the portable lamp, control instructions from the connected object via one of the Bluetooth wireless connection and the optical wireless connection, the control instructions including the received data that includes the semantic information to be displayed as the light pattern containing the alphanumeric characters;
   transmitting, by a transmitter of the portable lamp, parameters to the connected object via one of the Bluetooth wireless connection and the optical wireless connection, the parameters including a state of the portable lamp;
   controlling (i) the light transmitted by the lighting circuitry based on the received control instructions, and (ii) the laser scanning projector based on the control instructions such that the focusing element focuses the received data as the light pattern containing the alphanumeric characters; and
   in a state in which both the light beam transmission circuitry and the laser scanning projector are turned on, turning off one of the light beam transmission ciruictry and the laser scanning projector while keeping the other of the light beam transmission circuitry and the laser scanning projector turned on.

11. The method according to claim 10, further comprising:
   projecting the control instructions.

12. The method according to claim 10, wherein the control instructions further include instructions relating to features of the at least one light beam, and the method further comprises:

controlling the light beam transmission circuitry of the at least one light beam; and transmitting the control instructions.

13. A portable lamp wirelessly connected to a connected object, said portable lamp comprising:

a light beam transmitter configured to transmit at least one light beam;

a laser scanning projector configured to project received data and including a focusing element, the received data being semantic information to be displayed as a light pattern containing alphanumeric characters;

a battery configured to power the light beam transmitter and the laser scanning projector; and control circuitry configured to:
(i) communicate with the connected object via one of a Bluetooth wireless connection and an optical wireless connection (a) by receiving control instructions from the connected object, the control instructions including the received data that includes the semantic information to be displayed as the light pattern containing the alphanumeric characters, and (b) by transmitting parameters to the connected object,
(ii) control the at least one light beam transmitted by the light beam transmitter based on the received control instructions, and
(iii) control the laser scanning projector based on the received control instructions so that the laser scanning projector projects the received data as the light pattern containing the alphanumeric characters, wherein said portable lamp is a head lamp and each of the light beam transmitter, the laser scanning projector, the battery, and the control circuitry are disposed therein, and wherein in a state in which both the light beam transmission circuitry and the laser scanning projector are turned on, the control circuitry is configured to turn off one of the light beam transmission circuitry and the laser scanning projector while keeping the other of the light beam transmission circuitry and the laser scanning projector turned on.

* * * * *

UNITED STATES PATENT AND TRADEMARK OFFICE
CERTIFICATE OF CORRECTION

PATENT NO. : 11,268,680 B2
APPLICATION NO. : 15/802762
DATED : March 8, 2022
INVENTOR(S) : Jean-Luc Bazin et al.

It is certified that error appears in the above-identified patent and that said Letters Patent is hereby corrected as shown below:

In the Claims

In Column 8, Claim 10, Line 61, delete "ciruictry" and insert -- circuitry --, therefor.

Signed and Sealed this
Twenty-eighth Day of June, 2022

Katherine Kelly Vidal
*Director of the United States Patent and Trademark Office*